United States Patent
Ng et al.

(10) Patent No.: US 12,082,264 B2
(45) Date of Patent: Sep. 3, 2024

(54) METHOD AND APPARATUS FOR CONTROL RESOURCE SET CONFIGURATION FOR 5G NEXT RADIO SYSTEM

(71) Applicant: Samsung Electronics Co., Ltd., Suwon-si (KR)

(72) Inventors: Boon Loong Ng, Plano, TX (US); Young-Han Nam, Plano, TX (US); Vikram Chandrasekhar, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/813,296

(22) Filed: Jul. 18, 2022

(65) Prior Publication Data

US 2022/0353920 A1 Nov. 3, 2022

Related U.S. Application Data

(63) Continuation of application No. 16/031,655, filed on Jul. 10, 2018, now Pat. No. 11,395,338.

(Continued)

(51) Int. Cl.
*H04W 72/23* (2023.01)
*H04W 48/10* (2009.01)
(Continued)

(52) U.S. Cl.
CPC ....... *H04W 74/0833* (2013.01); *H04W 48/10* (2013.01); *H04W 48/12* (2013.01);
(Continued)

(58) Field of Classification Search
CPC . H04W 74/0833; H04W 48/10; H04W 48/12; H04W 72/0453; H04W 72/23;
(Continued)

(56) References Cited

U.S. PATENT DOCUMENTS

| 10,506,502 B2 | 12/2019 | Martinez Tarradell |
| 2015/0043476 A1 | 2/2015 | Takeda et al. |

(Continued)

FOREIGN PATENT DOCUMENTS

| CN | 105519167 A | 4/2016 |
| CN | 105659518 A | 6/2016 |

(Continued)

OTHER PUBLICATIONS

Catt, "Configuration aspects of the NR-PDCCH", 3GPP TSG RAN WG1 NR Ad-Hoc#2, R1-1710076, Jun. 27-30, 2017 (Year: 2017).*

(Continued)

*Primary Examiner* — Thinh D Tran

(57) ABSTRACT

A method of a user equipment (UE) for control resource set (CORESET) configuration in a wireless communication system is provided. The method comprises receiving, from a base station (BS), system information, determining whether the system information includes a random access channel (RACH) CORESET configuration, determining a CORSET to use for transmitting data based on whether the RACH CORESET configuration is included in the system information, and receiving, from the BS, the data based on the determined CORESET over an RACH.

16 Claims, 19 Drawing Sheets

Related U.S. Application Data

(60) Provisional application No. 62/531,777, filed on Jul. 12, 2017.

(51) Int. Cl.

| | |
|---|---|
| *H04W 48/12* | (2009.01) |
| *H04W 72/0453* | (2023.01) |
| *H04W 74/00* | (2009.01) |
| *H04W 74/0833* | (2024.01) |
| H04W 48/16 | (2009.01) |
| H04W 76/27 | (2018.01) |

(52) U.S. Cl.
CPC ....... *H04W 72/0453* (2013.01); *H04W 72/23* (2023.01); *H04W 74/006* (2013.01); *H04W 48/16* (2013.01); *H04W 76/27* (2018.02)

(58) Field of Classification Search
CPC ... H04W 74/006; H04W 48/16; H04W 76/27; Y02D 30/70
See application file for complete search history.

(56) References Cited

U.S. PATENT DOCUMENTS

| | | | |
|---|---|---|---|
| 2015/0078275 A1 | 3/2015 | Kim et al. | |
| 2015/0103777 A1 | 4/2015 | Chen et al. | |
| 2016/0219475 A1 | 7/2016 | Kim | |
| 2017/0019930 A1 | 1/2017 | Lee et al. | |
| 2017/0142766 A1 | 5/2017 | Kim | |
| 2018/0183551 A1 | 6/2018 | Chou | |
| 2018/0192383 A1* | 7/2018 | Nam | H04W 72/23 |
| 2018/0279135 A1 | 9/2018 | Hwang | |
| 2018/0309560 A1 | 10/2018 | Tang | |
| 2019/0069277 A1 | 2/2019 | Awad | |
| 2019/0357185 A1* | 11/2019 | Kwak | H04L 1/0075 |
| 2020/0100258 A1 | 3/2020 | Lindoff | |
| 2020/0119874 A1* | 4/2020 | Liu | H04W 72/23 |
| 2020/0145950 A1* | 5/2020 | Harada | H04W 72/0446 |
| 2020/0154467 A1 | 5/2020 | Gong | |
| 2020/0389917 A1* | 12/2020 | Kwak | H04W 48/10 |
| 2021/0153202 A1 | 5/2021 | Takeda | |

FOREIGN PATENT DOCUMENTS

| | | |
|---|---|---|
| CN | 106105366 A | 11/2016 |
| WO | 2017055225 A1 | 4/2017 |
| WO | 2017058288 A1 | 4/2017 |

OTHER PUBLICATIONS

Nam et al., "Method and apparatus for system information delivery in advanced wireless systems", U.S. Appl. No. 62/507,924, filed May 18, 2017 (Year: 2017).*
Kwak et al, "Monitoring Control Channels in Control Resource Sets for New Radio (Nr)", provisional app. 6246217 filed on Mar. 7, 2017 (Year: 2017).*
Kwak et al., "CORESET configuration for system information delivery", U.S. Appl. No. 62/501,883, filed May 5, 2017 (Year: 2017).*
Intel Corporation, "CORESETs for NR PDCCH", 3GPP TSG RAN WG1 NR, R1-1710543, available on Jun. 27-30, 2017 (Year: 2017).*
Fujitsu, "Discussion on the CORESET for RMSI delivery", 3GPP TSG RAN WG1 NR, R1-1710233, available on Jun. 27-30, 2017 (Year: 2017).*
Extended European Search Report issued Nov. 17, 2022 regarding Application No. 22189118.7, 13 pages.
Korean Intellectual Property Office, Office Action dated Aug. 5, 2022 regarding Application No. 10-2020-7001055, 9 pages.
Samsung, "Remaining minimum system information delivery", 3GPP TSG RAN WG1 NR Ad-Hoc#2, R1-1710630, Jun. 2017, 4 pages.
Huawei et al., "Search space design considerations", 3GPP TSG RAN WG1 Meeting #88bis, R1-1704202, Apr. 2017, 4 pages.
"LTE; Evolved Universal Terrestrial Radio Access (E-UTRA); Physical Channels and Modulation (3GPP TS 36.211 version 13.0.0 Release 13);" ETSI TS 136.211; V13.0.0, Jan. 2016, 143 pages.
"LTE; Evolved Universal Terrestrial Radio Access (E-UTRA); Multiplexing and Channel Coding; (3GPP TS 36.212 version 13.0.0 Release 13);" ETSI TS 136.212; V13.0.0, Jan. 2016, 123 pages.
"LTE; Evolved Universal Terrestrial Radio Access (E-UTRA); Physical Layer Procedures; (3GPP TS 36.213 version 13.0.0 Release 13);" ETSI TS 136.213; V13.0.0, May 2016, 328 pages.
"LTE; Evolved Universal Terrestrial Radio Access (E-UTRA); Medium Access Control (MAC) protocol specification (3GPP TS 36.321 version 13.0.0 Release 13);" ETSI TS 136.321; V13.0.0, Feb. 2016, 84 pages.
"LTE; Evolved Universal Terrestrial Radio Access (E-UTRA); Radio Resource Control (RRC); Protocol specification (3GPP TS 36.331 version 13.0.0 Release 13);" ETSI TS 136.331; V13.0.0, Jan. 2016, 670 pages.
International Search Report dated Oct. 11, 2018 in connection with International Patent Application No. PCT/KR2018/007917, 3 pages.
Panasonic, "On default bandwidth part", 3GPP TSG-RAN WG1 NR Ad-Hoc#, Jun. 27-30, 2017, 5 pages, R1-1710787.
Catt, "Configuration aspects of the NR-PDCCH", 3GPP TSG RAN WG1 NR Ad-Hoc#2, Jun. 27-30, 2017, 3 pages, R1-1710076.
Huawei, HiSilicon, "Configuration of control resource set", 3GPP TSG RAN WG1 NR Ad Hoc Meeting, Jun. 27-30, 2017, 5 pages, R1-1709951.
LG Electronics, "Discussion on CORESET configuration", 3GPP TSG RAN WG1 NR Ad-Hoc#2, Jun. 27-30, 2017, 7 pages, R1-1710305.
ZTE, "NR PDCCH Coreset Configuration", 3GPP TSG RAN WG1 Meeting #AH_NR2, Jun. 26-30, 2017, 5 pages, R1-1710106.
Supplementary European Search Report dated Apr. 17, 2020 in connection with European Patent Application No. 18 83 2079, 12 pages.
Samsung, "On Search Space Design", 3GPP TSG RAN WG1 Meeting 90bis, Oct. 9-13, 2017, R1-1717642, 8 pages.
CMCC, "CORESET Configuration for RMSI Scheduling", 3GPP TSG RAN WG1 Meeting NR Ad-Hoc #2, Jun. 27-30, 2017, R1-1710773, 4 pages.
Hwang et al., "Search Spaces in a wireless Communication System", U.S. Appl. No. 62/488,070, filed Apr. 21, 2017 (Year: 2017).
Tang, "Design of Physical Downlink Control Channel (PDCCH)", U.S. Appl. No. 62/474,696, filed Mar. 22, 2017 (Year: 2017).
Lindoff et al., "Methods of Wireless Device and Network Node, such Wireless device and network node, and computer programs thereof", U.S. Appl. No. 62/421,633, filed Nov. 14, 2016 (Year: 2016).
Chou et al., "Method for Signaling RAN Slicing Index and Radio Communication Equipment using the same", U.S. Appl. No. 62/439,434, filed Dec. 27, 2016 (Year: 2016).
Samsung, "RAN2 consideration for bandwidth part in NR", 3GPP TSG-RAN WG2 NR Ad-hoc#2 Meeting R2-1706427 available on Jun. 27-29, 2017 (Year: 2017).
Korean Intellectual Property Office, Office Action issued Feb. 9, 2023 regarding Application No. 10-2020-7001055, 9 pages.
LG Electronics, "RACH procedure", 3GPP TSG RAN WG1 Meeting NR#2, R1-1710271, Jun. 2017, 4 pages.
Chinese National Intellectual Property Administration, Decision to Grant issued Jul. 26, 2023 regarding Application No. 201880046795. 6, 8 pages.
Intel Corporation, "Resource allocation for PUCCH during initial access", 3GPP TSG RAN WG1 Meeting #89, R1-1707395, May 2017, 4 pages.

* cited by examiner

METHOD AND APPARATUS FOR CONTROL RESOURCE SET CONFIGURATION FOR 5G NEXT RADIO SYSTEM

CROSS-REFERENCE TO RELATED APPLICATIONS AND CLAIM OF PRIORITY

This application is a continuation of U.S. patent application Ser. No. 16/031,655, filed on Jul. 10, 2018, which claims the benefit of U.S. Provisional Patent Application No. 62/531,777, filed on Jul. 12, 2017. The contents of the above-identified patent documents are incorporated herein by reference.

TECHNICAL FIELD

The present application relates generally to wireless communication systems. More specifically, this disclosure relates to resource set configuration in next generation wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting resource set configuration beyond 4th-Generation (4G) communication system such as long term evolution (LTE). Embodiments of the present disclosure provide multiple services in advanced communication systems.

In one embodiment, a user equipment (UE) for control resource set (CORESET) configuration in a wireless communication system is provided. The UE includes a transceiver configured to receive, from a base station (BS), system information. The UE further includes a processor operably connected to the transceiver, the processor configured to determine whether the system information includes a random access channel (RACH) CORESET configuration; and determine a CORESET to use for receiving a random access response (RAR) based on whether the RACH CORESET configuration is included in the system information. The transceiver is further configured to receive, from the BS, the data based on the determined CORESET.

In another embodiment, a base station (BS) for control resource set (CORESET) configuration in a wireless communication system is provided. The BS includes a processor configured to determine a random access channel (RACH) CORESET configuration. The BS further includes a transceiver operably connected to the processor, the transceiver configured to transmit, to a user equipment (UE), system information, wherein the system information includes RACH CORESET configuration, and transmit, to the UE, RAR based on CORESET over an RACH, wherein the CORESET is used for transmitting the RAR based on whether the RACH CORESET configuration is included in the system information.

In yet another embodiment, a method of a user equipment (UE) for control resource set (CORESET) configuration in a wireless communication system is provided. The method comprises receiving, from a base station (BS), system information, determining whether the system information includes a random access channel (RACH) CORESET configuration, determining a CORSET to use for transmitting a random access response (RAR) based on whether the RACH CORESET configuration is included in the system information, and receiving, from the BS, the data based on the determined CORESET.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.321 v13.0.0, "E-UTRA, Medium Access Control (MAC) protocol specification;" and 3GPP TS 36.331 v13.0.0, "E-UTRA, Radio Resource Control (RRC) Protocol Specification.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
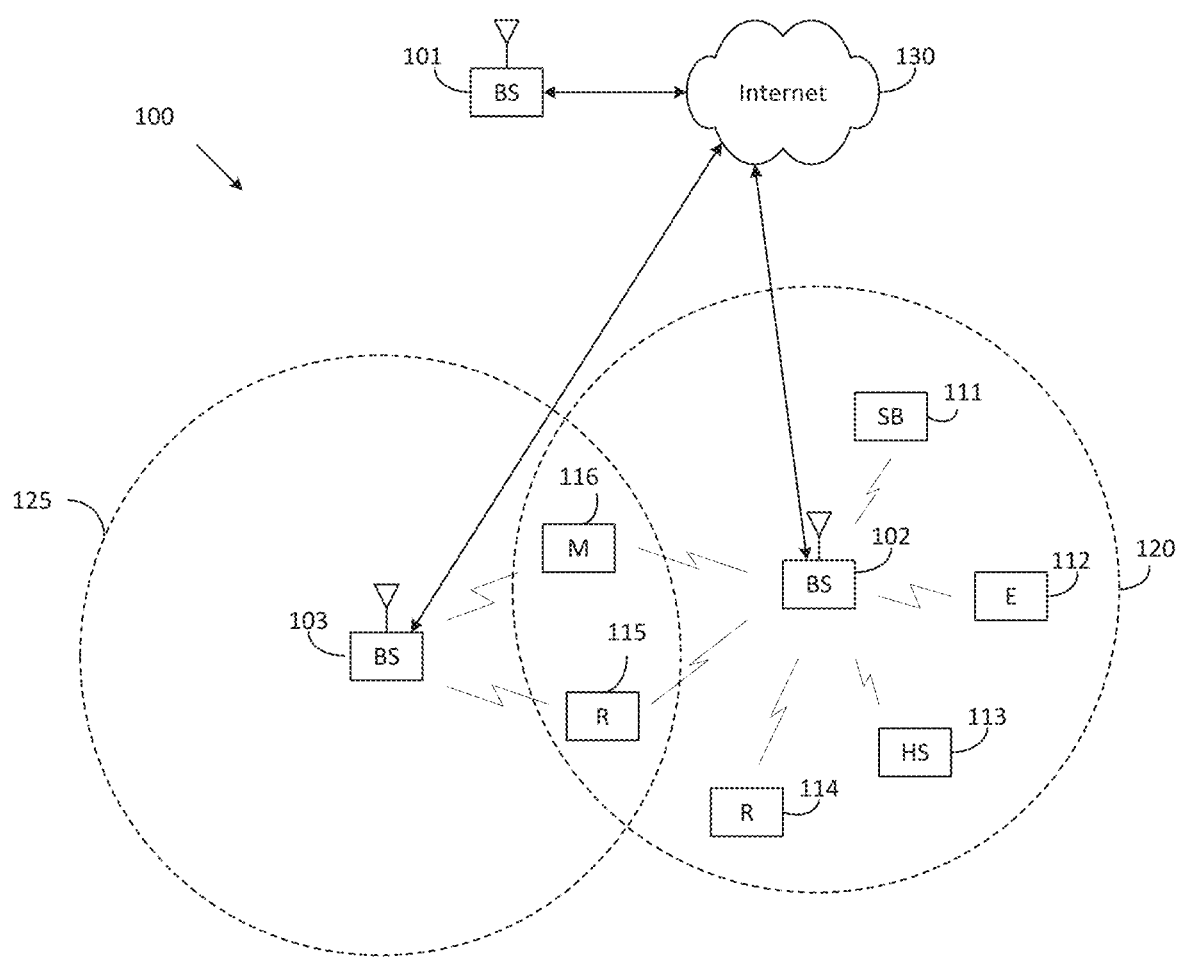
FIG. 1 illustrates an example wireless network according to embodiments of the present disclosure.
Figure 2:
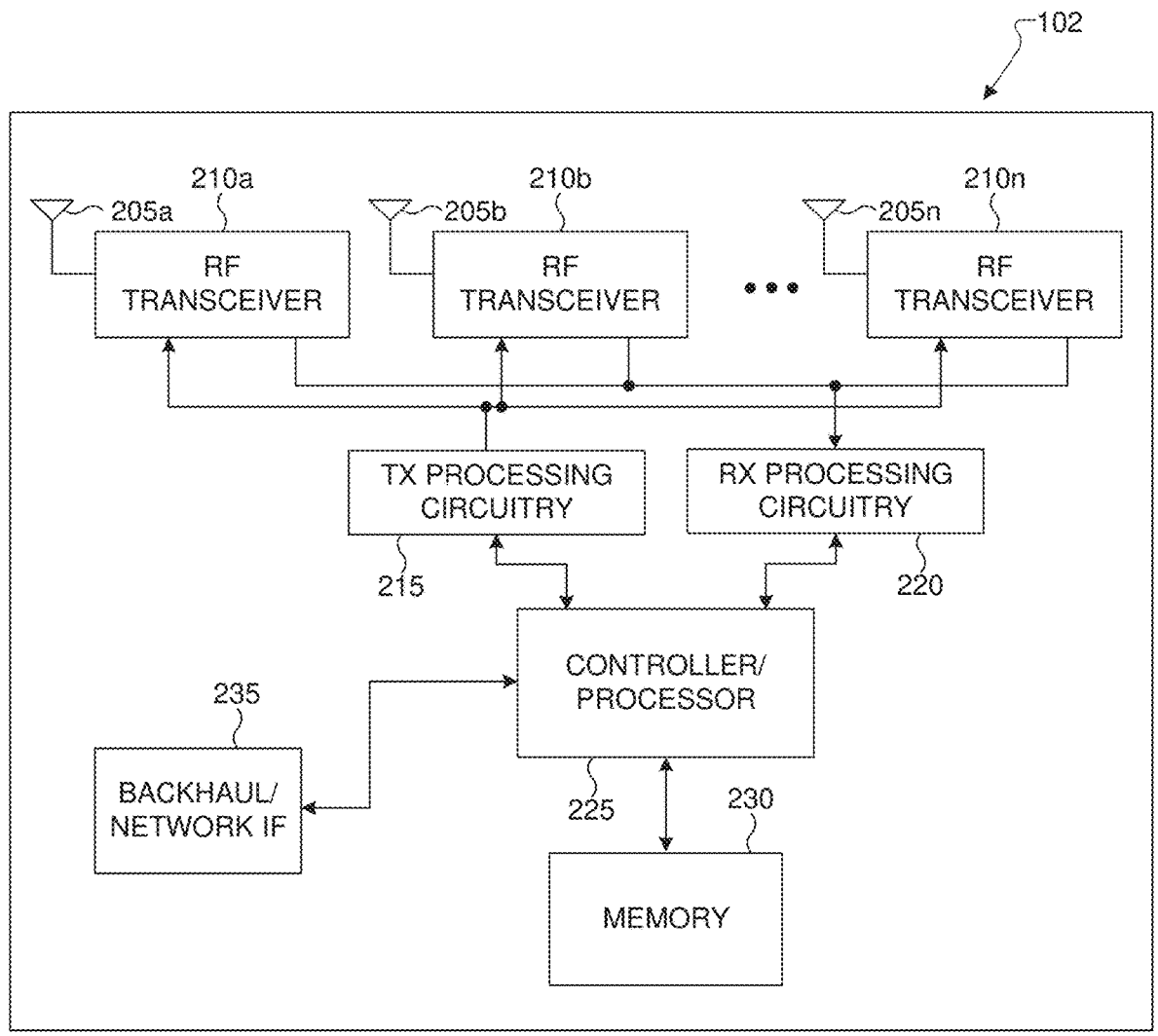
FIG. 2 illustrates an example eNB according to embodiments of the present disclosure.
Figure 3:
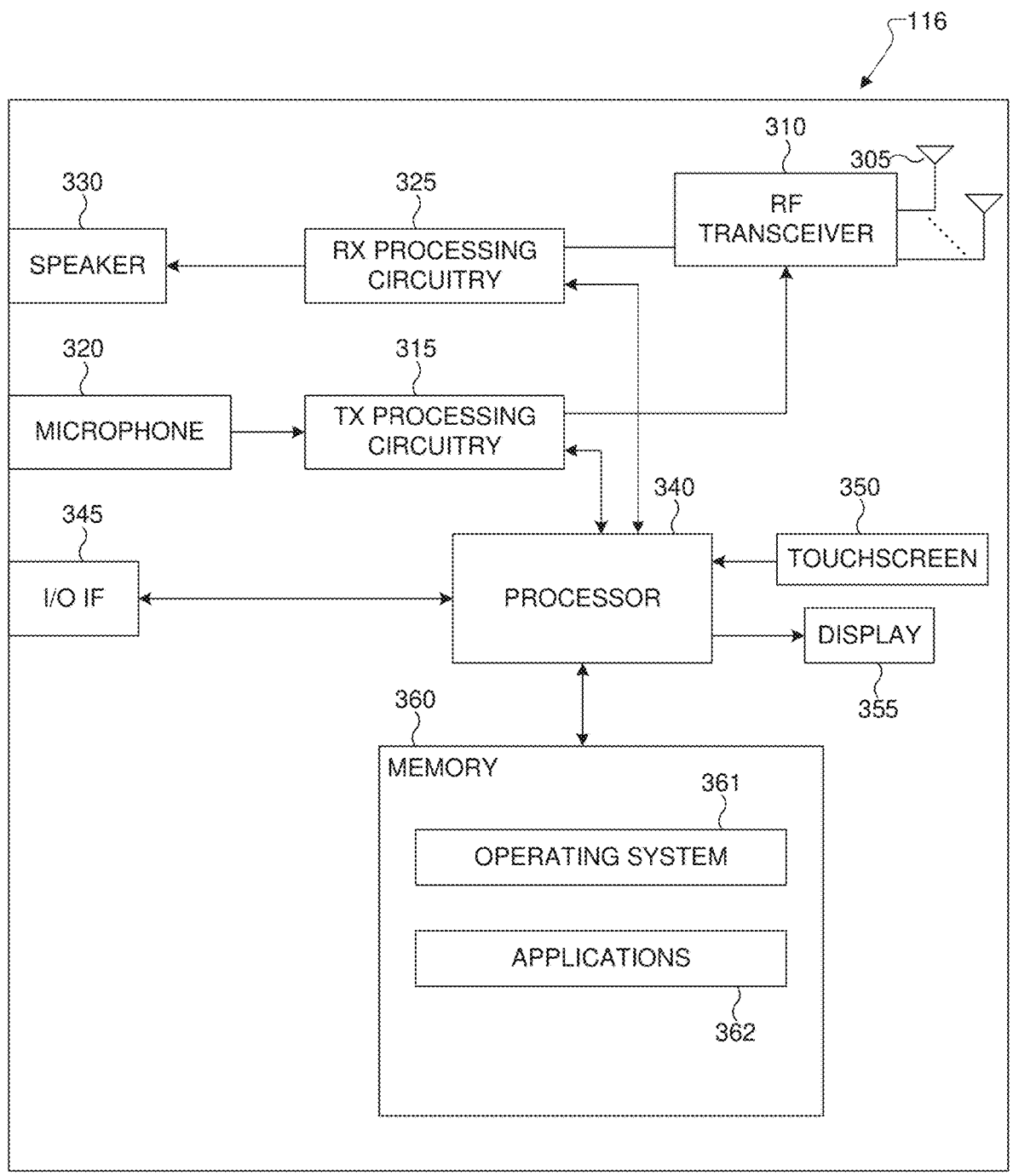
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient control resource set configuration in an advanced wireless communication system. In certain embodiments, and one or more of the eNBs 101-103 includes circuitry, programing, or a combination thereof, for efficient control resource set configuration in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
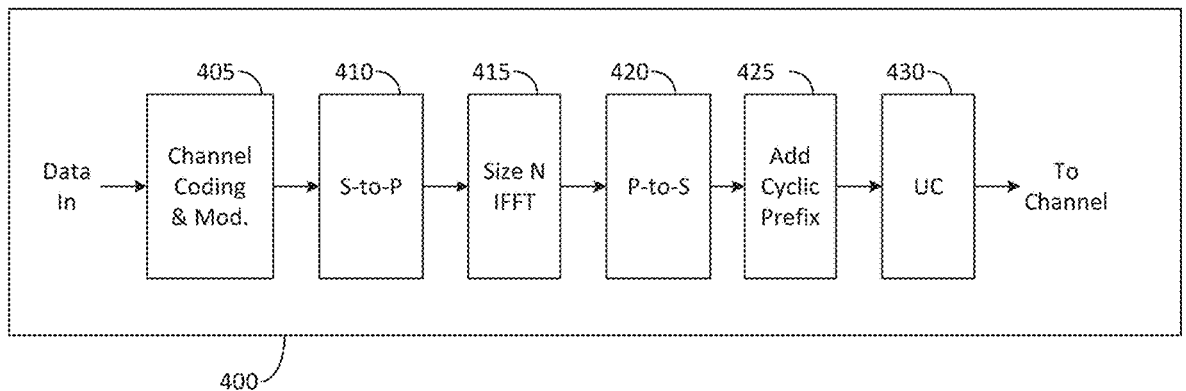
FIG. 4A illustrates an example high-level diagram of an orthogonal frequency division multiple access transmit path according to embodiments of the present disclosure.
Figure 4B:
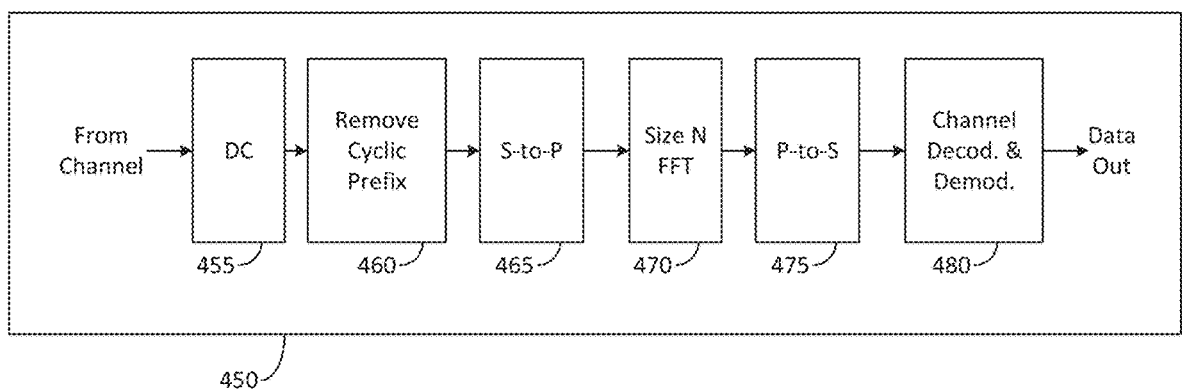
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g., user equipment 116 of FIG. 1). In other examples, for uplink communication, the receive path circuitry 450 may be implemented in a base station (e.g., eNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

Figure 5:
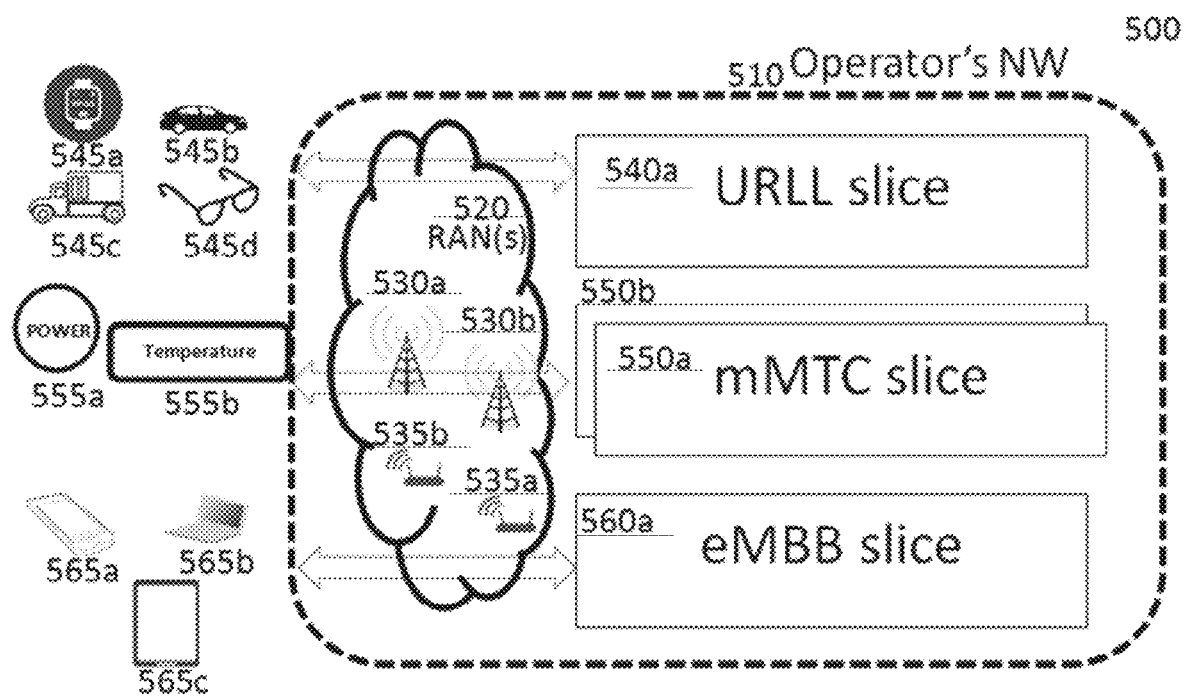
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540*a*, 550*a*, 550*b* and 560*a*, are supported by the network. The URLL slice 540*a* to serve UEs requiring URLL services, e.g., cars 545*b*, trucks 545*c*, smart watches 545*a*, smart glasses 545*d*, etc. Two mMTC slices 550*a* and 550*b* serve UEs requiring mMTC services such as power meters and temperature control (e.g., 555*b*), and one eMBB slice 560*a* requiring eMBB serves such as cells phones 565*a*, laptops 565*b*, tablets 565*c*.

In short, network slicing is a scheme to cope with various different qualities of services (QoS) in the network level. For supporting these various QoS efficiently, slice-specific PHY optimization may also be necessary. Devices 545*a/b/c/d*, 555*a/b* are 565*a/b/c* examples of user equipment (UE) of different types. The different types of user equipment (UE) shown in FIG. 5 are not necessarily associated with particular types of slices. For example, the cell phone 565*a*, the laptop 565*b* and the tablet 565*c* are associated with the eMBB slice 560*a*, but this is just for illustration and these devices can be associated with any types of slices.

In some embodiments, one device is configured with more than one slice. In one embodiment, the UE, (e.g., 565*a/b/c*) is associated with two slices, the URLL slice 540*a* and the eMBB slice 560*a*. This can be useful for supporting online gaming application, in which graphical information are transmitted through the eMBB slice 560*a*, and user interaction related information are exchanged through the URLL slice 540*a*.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
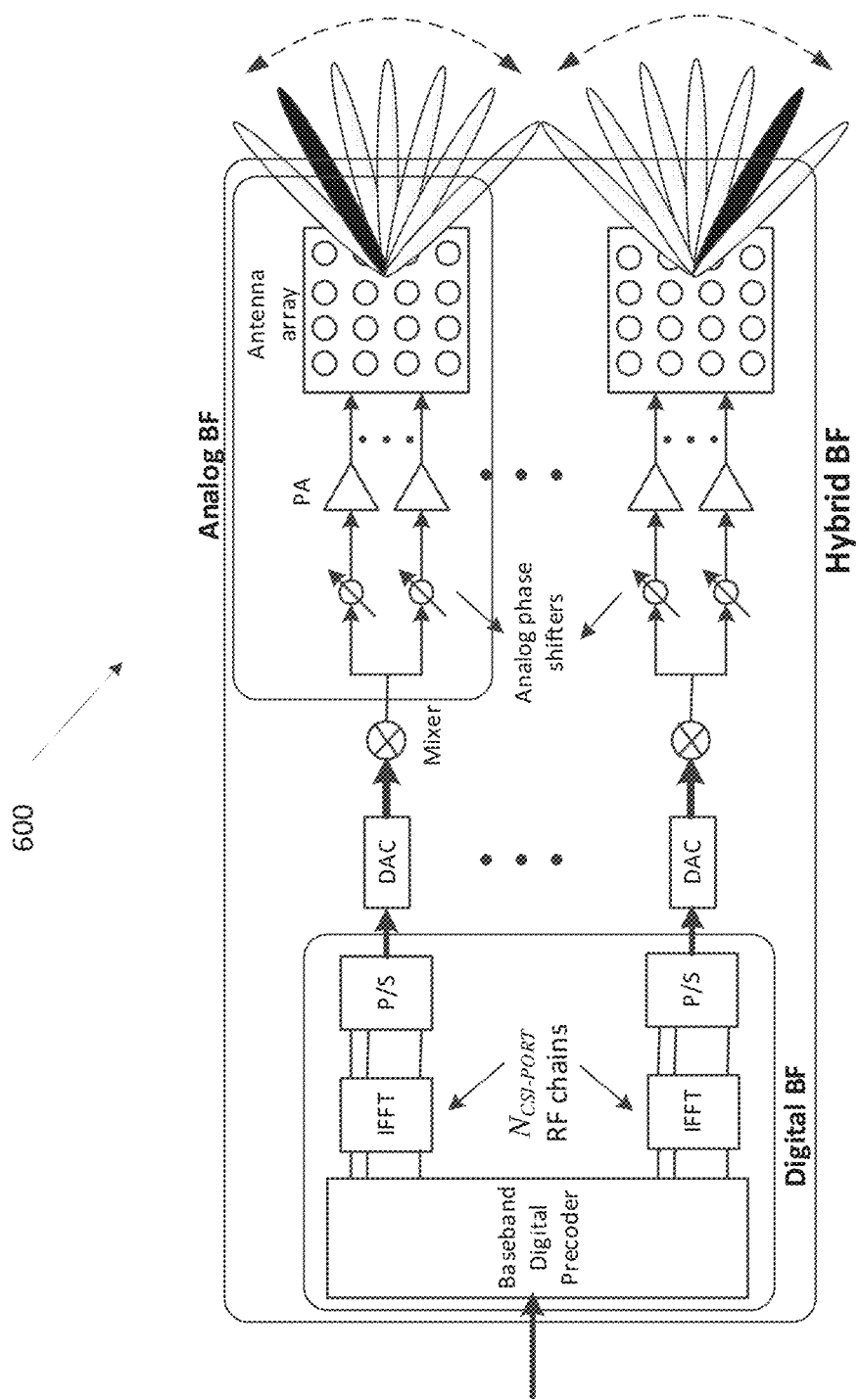
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may be feasible for gNB to provide coverage with a single transmit beam, i.e., ensure adequate received signal quality at the UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

Figure 7:
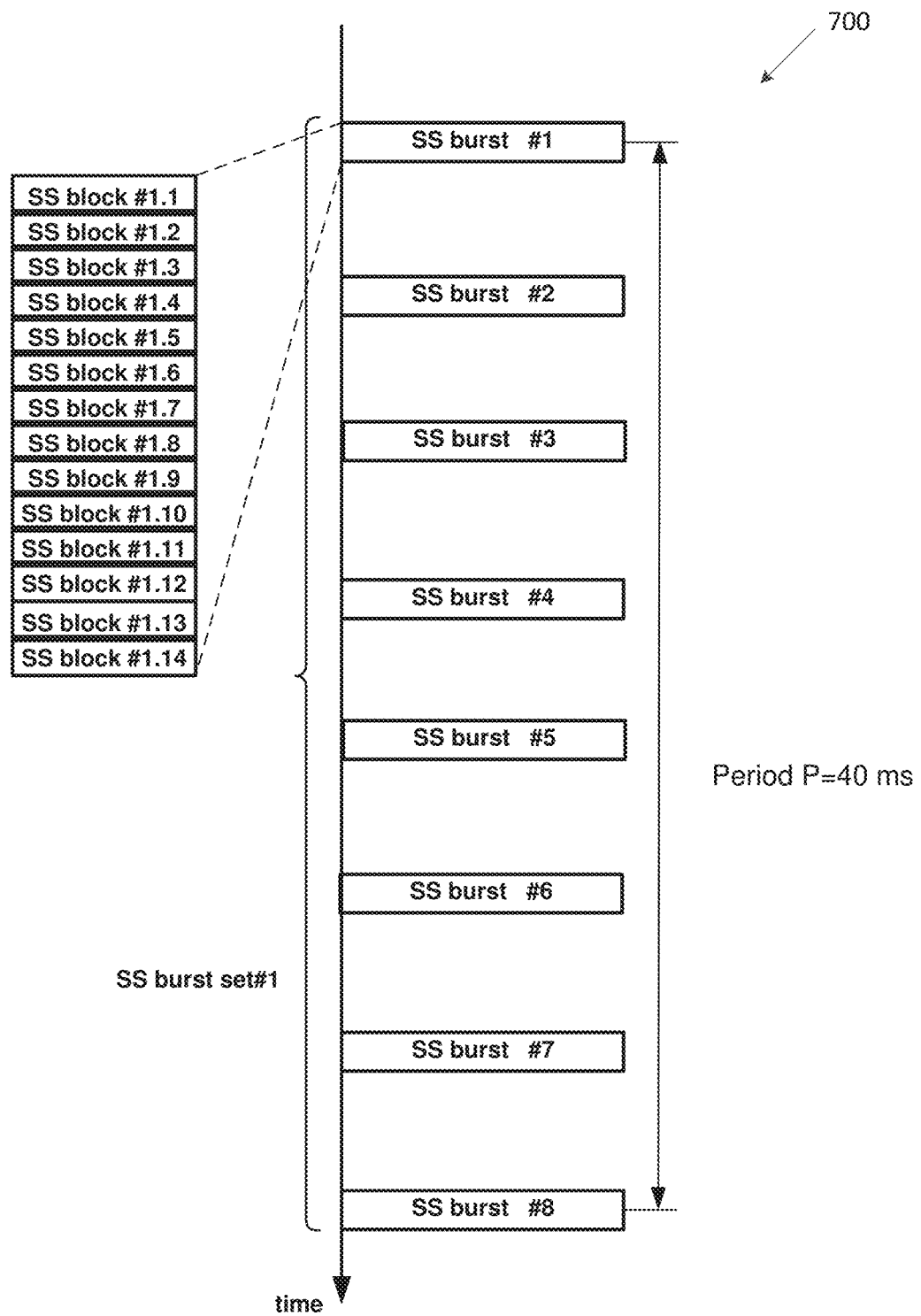
FIG. 7 illustrates an example SS block/burst/set according to embodiments of the present disclosure.

FIG. 7 illustrates an example SS block/burst/set 700 according to embodiments of the present disclosure. An embodiment of the SS block/burst/set 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

As shown in FIG. 7, an SS burst set means a set of $N_1$ SS bursts; the SS burst set is periodically recurring with period P, where P is an integer, e.g., 5, 10, 20, 40, 80, etc. in terms of millisecond and $N_1$ is an integer, e.g., 1, 2 or 4. An SS burst means a set of consecutive $N_2$ SS blocks, where $N_2$ is an integer, e.g., 7, 14, 28, 56. An SS block comprises a combination of synchronization signals, broadcast signals, and reference signals, which are multiplexed in TDM, FDM, CDM or hybrid manner. A cell coverage is provided by a beam sweep over SS blocks comprising a burst set. Different TRP Tx beams may be used for different SS blocks within a burst set. In one example design, each SS burst set consists of eight SS burst and each SS burst consist of fourteen SS blocks, as illustrated in FIG. 7. One SS block consists of FDM-ed PSS, SSS, ESS.

This disclosure provides methods for the UE to obtain control resource set (CORESET) configurations in advanced wireless systems, in conjunction with multi-beam and single-beam operations.

During an initial access procedure, a UE is configured with a set of remaining minimum system information (RMSI) CORESET(s) (e.g., from the MIB). The RMSI CORESETs may be alternatively referred to as MIB configured CORESETs. The number of configured RMSI CORESETs may be equal to the number of (actually transmitted) of SS blocks (each comprises PSS, SSS and PBCH) in the bandwidth part (BWP) or the carrier, i.e., one RMSI CORESET is configured per transmitted SS block. When configured with the RMSI CORESET(s), the UE is configured to detect the PDCCH on at least one of the RMSI CORESET(s), wherein the PDCCH schedules a PDSCH carrying the RMSI message.

The RMSI message may contain, among other fields, configuration information regarding the CORESET(s) on which to receive PDCCH scheduling RACH response (RAR), herein referred to as the RAR CORESET. Alternatively, the RAR CORESET(s) may be the same as RMSI CORESET(s); or the RAR CORESET(s) may be a subset or a superset of RMSI CORESET(s). In one example, the periodicity of an RAR CORESET is an integer multiple of that of an RMSI CORESET, and in a certain time frequency resource the RAR CORESET and the RMSI CORESET coincide.

Besides the RMSI CORESET and RAR CORESET, there is a need to configure the UE with at least one additional CORESET configuration. Such an additional CORESET configuration is required at the UE in order to monitor (at least) unicast scheduling messages from the network. Here, the unicast scheduling message may refer to either DL assignment or UL grant or both.

The CORESET configuration may differ from the RMSI CORESET and the RAR CORESET configuration in the time/frequency resource allocation and the search spaces of the corresponding PDCCHs. For example, the CORESET transmission period may be shorter (i.e., UE monitors CORESET #1 more often) than the RMSI CORESET transmission period. The CORESET may be referred to as CORESET #1 in this disclosure. It can also be called the "default CORESET". The UE can be configured with additional CORESET configurations to CORESET #1 (i.e., CORESET #2, CORESET #3 . . . ), which is necessary/beneficial in certain deployment scenarios such as scenarios with multiple-TRP or multi-beam-pair-links per UE.

The UE assumes CORESET #1 can be used by the network to schedule or transmit one or more of the following: system information block (SIB) messages; group-cast messages (e.g., UE-group common PDCCH); paging messages; and/or unicast messages.

In one example, the UE assumes only unicast data scheduling in CORESET #1, whereas SIB and group cast messages are scheduled in RMSI CORESET. In another example, the UE assumes unicast data and group cast messages are scheduled in CORESET #1, whereas SIB messages are scheduled in RMSI CORESET.

CORESET #1 may be UE-specifically configured, or alternatively some components of CORESET #1 are UE-specifically configured and the other components of CORESET #1 are cell-specifically configured. CORESET #1 may be independently configured of the RMSI and the RAR CORESETs. Alternatively, CORESET #1 may at least partially overlap with one or more of the RMSI and the RAR CORESETs. In one example, on the BWP or on the carrier, L MIB-configured CORSETs are configured by MIB. The UE is further configured with CORESET #1 being equal to one of the L MIB-configured CORESETs. Or alternatively, CORESET #1 is configured to partially overlap with one of the N MIB-configured CORESETs, wherein the CORESET #1 occurs with shorter periodicity but some time occasions of the CORESET #1 coincides with the one of the L MIB-configured CORESETs; in one such case, the UE is indicated with an integer N, and then the UE may assume that the periodicity of the CORESET #1 is the 1/N multiple of the periodicity of the one of the L MIB-configured CORESETs.

Figure 8:
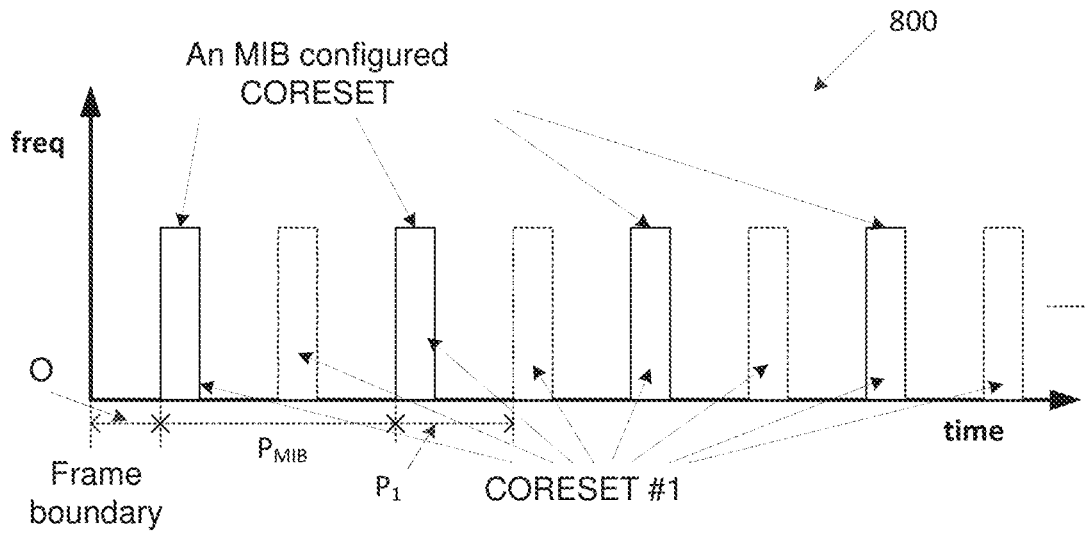
FIG. 8 illustrates an example CORESET #1 monitoring according to embodiments of the present disclosure.

FIG. 8 illustrates an example CORESET #1 monitoring 800 according to embodiments of the present disclosure. An embodiment of the CORESET #1 monitoring 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

FIG. 8 shows an illustrative example of the current embodiment. A UE detects an SS block containing an MIB, and the UE also obtains RMSI using one of the MIB configured CORESETs, which is denoted as "an MIB configured CORESET." The periodicity of the MIB configured CORESET is denoted as PMIS, which could be indicated in the MIB or pre-configured. The default CORESET or CORESET #1 is configured later e.g., by means of an integer N, which may determine the updated periodicity $P_1$, where $P_1 = P_{MIB}/N$. The CORESET #1 comprises all the time-frequency resources configured for the MIB configured CORESET and additional time-frequency resources according to the updated periodicity. In this case, the time offset (e.g., to the frame boundary) is commonly configured for both MIB configured CORESET and CORESET #1. In the overlapped time-frequency resources, the UE is configured to monitor RMSI (and maybe also RAR) PDCCHs, as well as those configured for CORESET #1 (e.g., PDCCHs for unicast, SIB, etc.).

Figure 9:
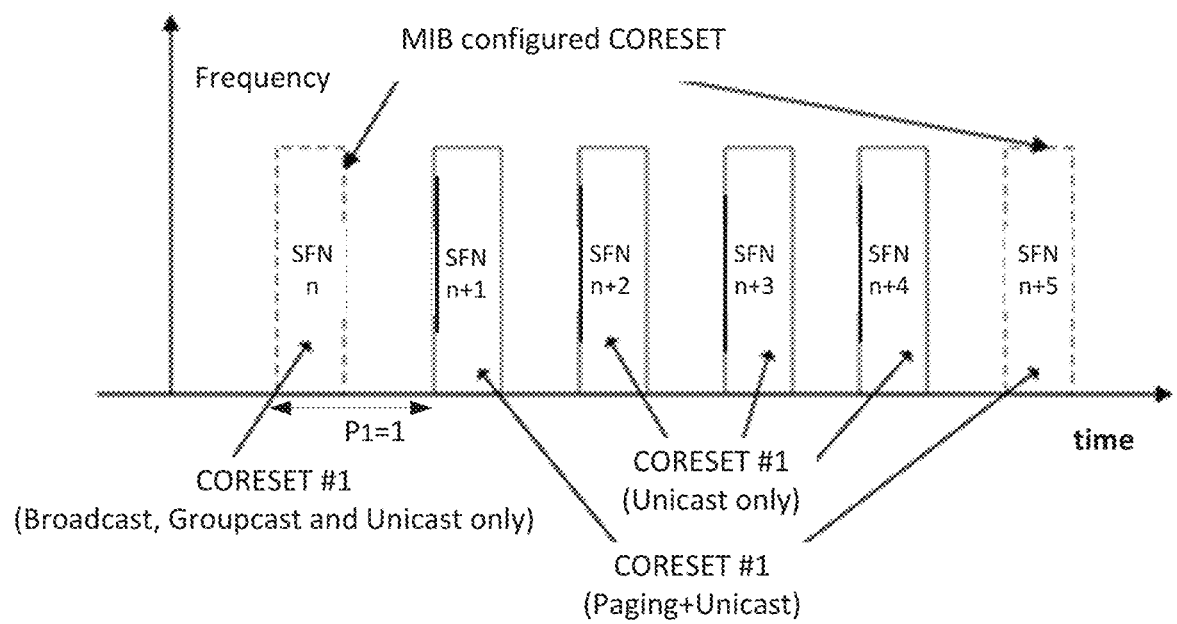
FIG. 9 illustrates an different CORESET #1 monitoring occasions according to embodiments of the present disclosure.

FIG. 9 illustrates a different CORESET #1 monitoring occasions 900 according to embodiments of the present disclosure. An embodiment of the different CORESET #1 monitoring occasions 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

In one embodiment, as shown in FIG. 9, to facilitate battery savings and flexible operation, as part of the CORESET #1 configuration, the network may configure the PDCCH monitoring occasions for the UE to receive broadcast, paging and group-cast. The reason for doing so would be that the frequency of broadcast and group-cast messages may be sent relatively infrequently, so the UE could reduce the UE's PDCCH blind decodes if the knows the occasions when the UE does not receive these messages. For example, if the monitoring occasion for CORESET #1 is once per radio frame ($P_1=1$), in addition to monitoring PDCCH for unicast messages on each CORESET #1 occasion, the UE may monitor PDCCH scheduling broadcast and group-cast messages only once every 10 radio frames and PDCCH scheduling paging messages on every 4 radio frames.

When CORESET #1 is configured by means of the integer to update the periodicity of a selected MIB configured CORESET, the UE may assume that the antenna ports on CORESET #1 and the PDCCH antenna port transmitted on MIB configured CORESET are QCL'ed in a set of QCL parameters, including spatial parameters. The PDCCH antenna port on CORESET #1 may be QCL'ed with the antenna port used for a corresponding SS block. When these QCL relations hold, the UE may use a common Rx beam to receive those signals/channels, and hence the UE does not need to apply additional Rx beam sweeping, which reduces latency and UE power consumption.

Figure 10:
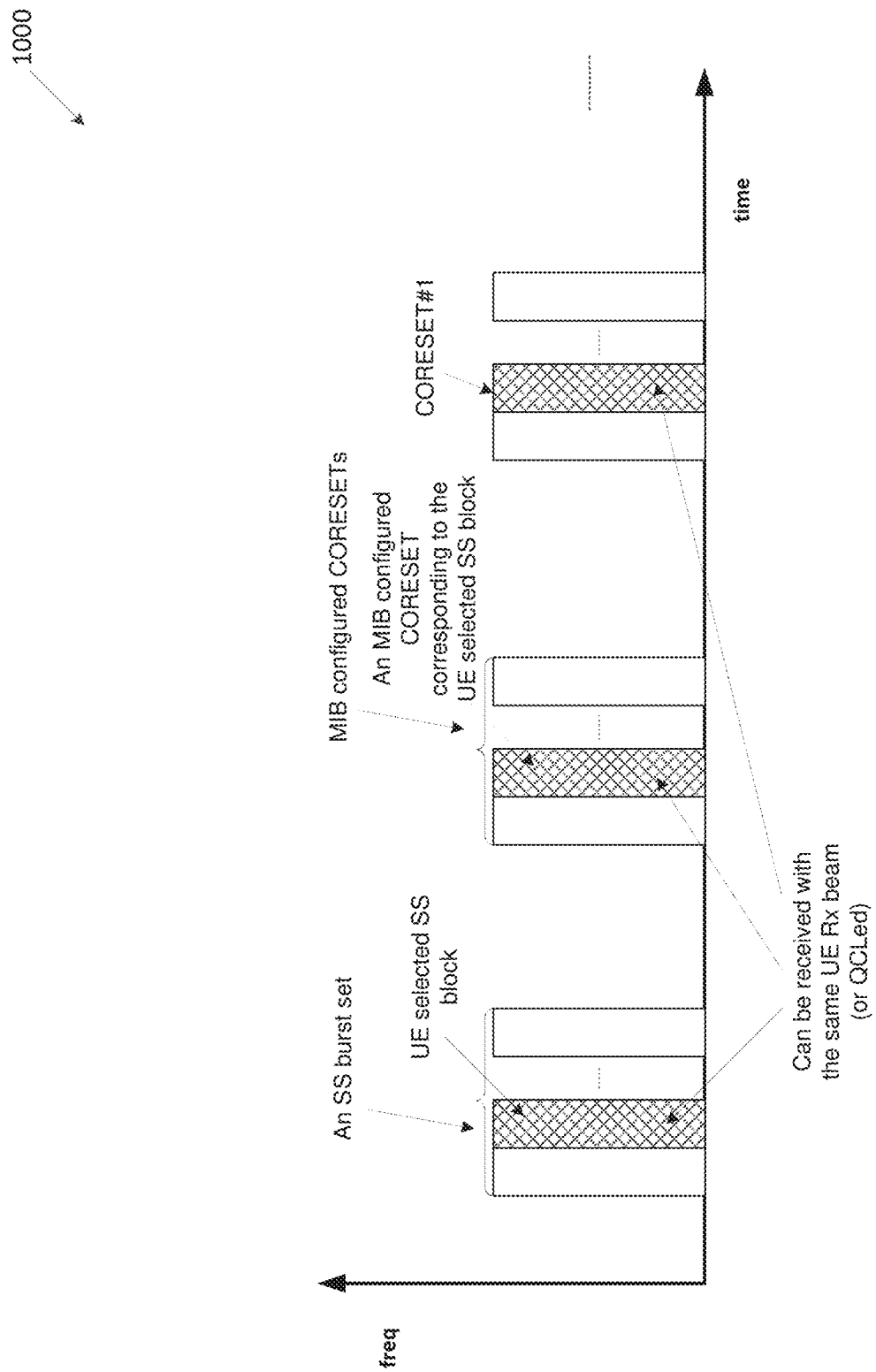
FIG. 10 illustrates an example MIB configured CORESET according to embodiments of the present disclosure.

FIG. 10 illustrates an example MIB configured CORESET 1000 according to embodiments of the present disclosure. An embodiment of the MIB configured CORESET 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

FIG. 10 shows an illustrative example of the current embodiment. A UE detects an SS block containing an MIB, and the UE makes a selection of the SS block. The MIB configures a set of MIB configured CORESETs, from which the UE identifies a CORESET whose antenna port is QCLed the selected SS block. When configured with CORESET #1, the UE may assume that the configured CORESET #1 is QCLed with the selected MIB configured CORESET, which is QCLed with the UE selected SS block. It is noted that CORESET #1 may be a super set of the MIB configured CORESET corresponding to the UE selected SS block.

In order to achieve CORESET #1 configuration overhead reduction, the CORESET #1 configuration can reuse some of the configuration information, such as the PDCCH monitoring occasions, search spaces, of the RMSI CORESET with modifications. The time instances of the CORESET #1 can be specified to be a function of the time instances of the RMSI CORESET; for example, the periodicity of the CORESET #1 is an N or 1/N multiple of the periodicity of the RMSI CORESET, with or without a non-zero time offset (e.g., OFDM symbol, slot, radio frame), wherein N is a positive integer. Similarly, the bandwidth (or the frequency resource block) of the CORESET #1 can be an M or 1/M multiple of the RMSI CORESET bandwidth with or without a frequency offset (e.g., resource blocks, bandwidth parts), wherein M is a positive integer.

Figure 11:
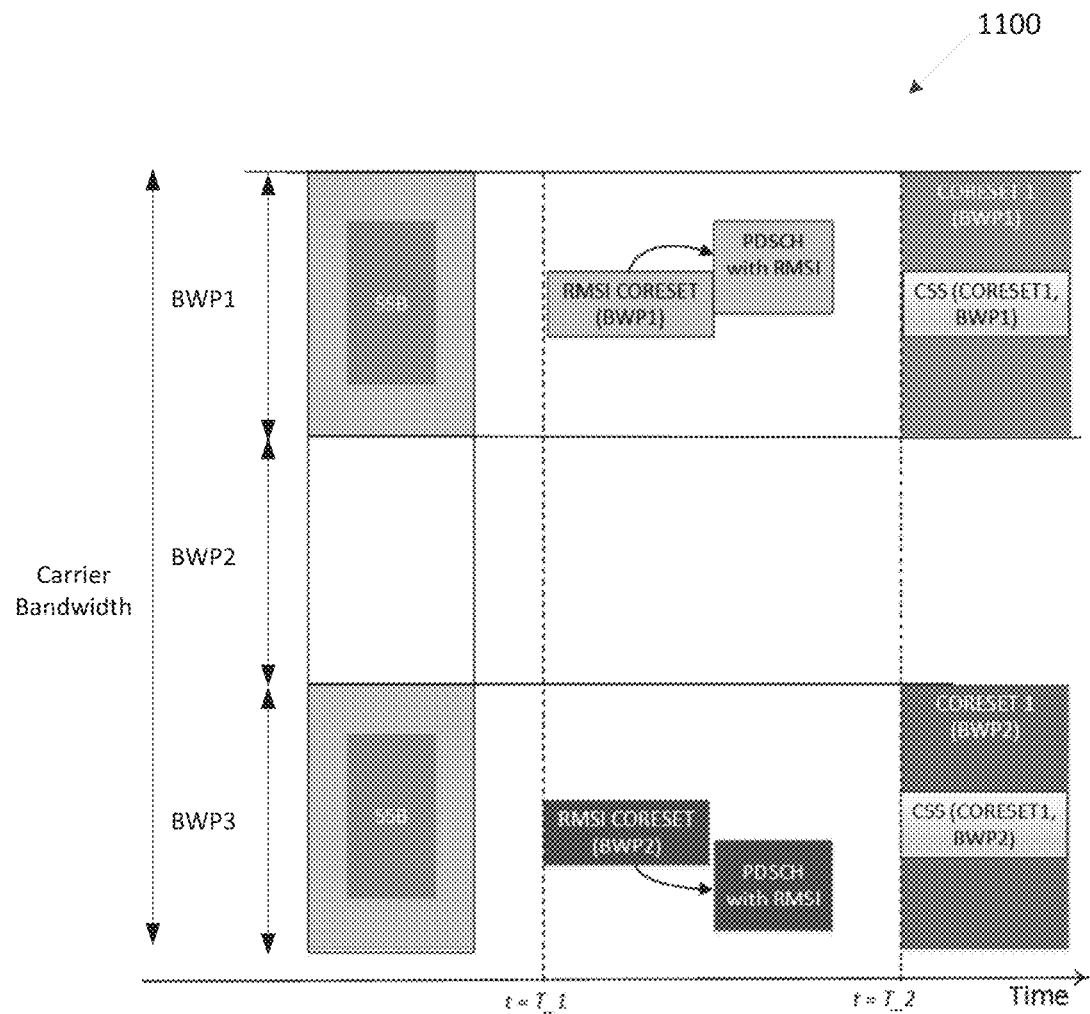
FIG. 11 illustrates an example CORESET #1 configured on each BWP according to embodiments of the present disclosure.

FIG. 11 illustrates an example CORESET #1 configured on each BWP 1100 according to embodiments of the present disclosure. An embodiment of the CORESET #1 configured on each BWP 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In one embodiment, the UE may assume that the CORESET #1 is centered around the BWP on which the UE receives SS block as shown in FIG. 11. In other words, the frequency center of the CORESET #1 is the same as that of the corresponding BWP (e.g., in terms of subcarrier or PRB index). This helps the network avoid having to explicitly signal the frequency domain location of CORESET #1.

In another example, a configuration overhead is reduced and blind searches are reduced to configure the common search space (CSS) for CORESET #1 to occupy the same set of time/frequency resources (as shown in FIG. 11) as that of the RMSI CORESET. Thus, when the CORESET monitoring occasions for the RMSI CORESET and CORESET1 overlap, the UE can simply look for the UE's PDCCH candidates, including those scheduling RMSI, within CORESET 1. In this case, MIB configures one or more MIB-configured CORESET(s), and one of the one or more MIB-configured CORESETs corresponds to CORESET #1.

There is a need to define the methods for the UE to acquire the CORESET #1 configuration. In one embodiment, the UE obtains the CORESET #1 configuration when performing a random access procedure. For example, the UE obtains the CORESET #1 configuration from the random access response (RAR).

In another embodiment, the UE obtains the CORESET #1 configuration in message 4 (contention based random access).

Figure 12:
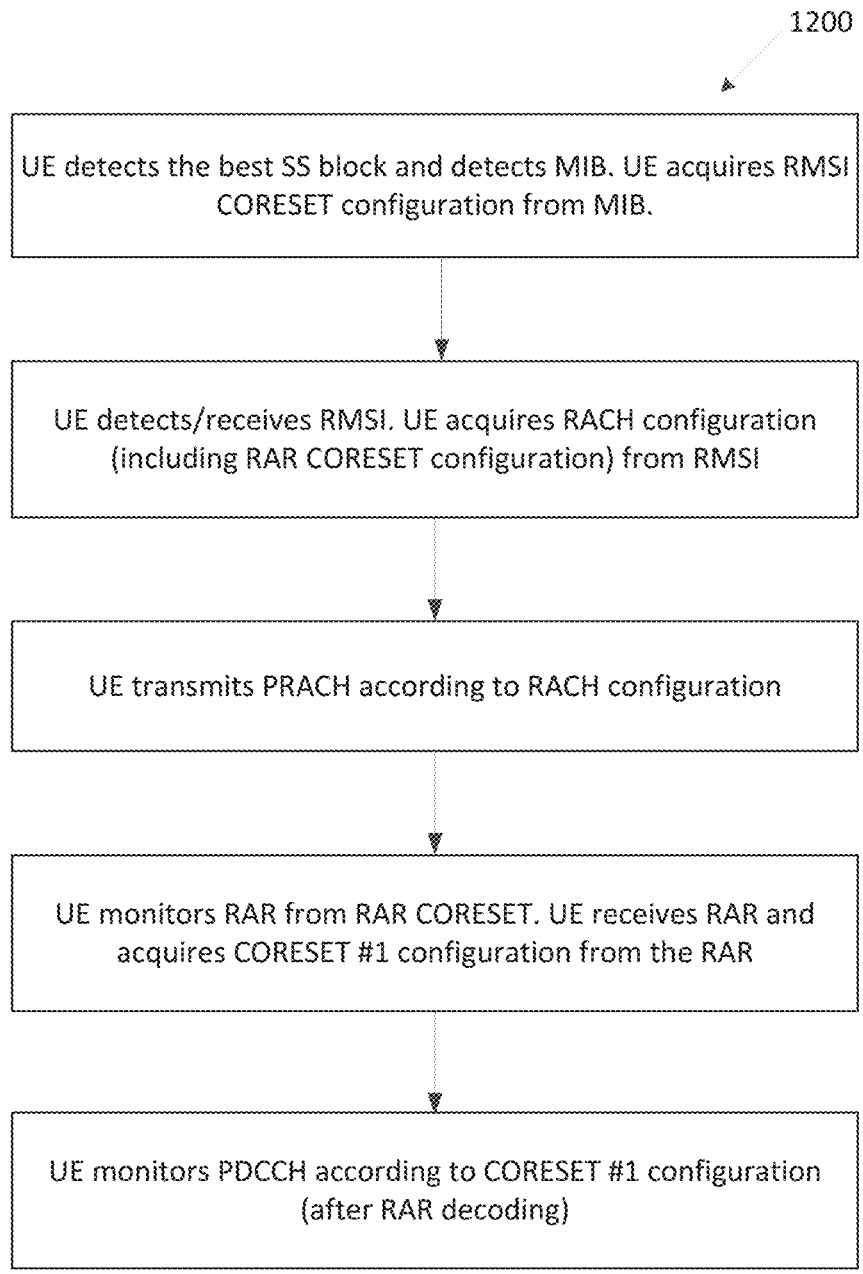
FIG. 12 illustrates a flow chart of a method for obtaining CORESET #1 configuration for RAR according to embodiments of the present disclosure.

FIG. 12 illustrates a flow chart of a method 1200 for obtaining CORESET #1 configuration for RAR according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

An example UE procedure of obtaining the CORESET #1 configuration from RAR during the initial access procedure is given in FIG. 12.

As shown in FIG. 12, the UE first detects the best SS block and decodes the MIB of a cell. The UE acquires the RMSI CORESET configuration from the MIB which informs the UE how to receive the RMSI messages of the cell. The UE then detects/receives the RMSI messages accordingly and acquires the system information on random access procedure (RACH configuration). This system information includes the RAR CORESET configuration, which informs the UE how to monitor for RAR upon transmission of Physical Random Access Channel (PRACH). To gain access to the cell, the UE transmits PRACH and then monitors the possible RAR from the network with the RAR CORESET configuration. If the network detects the UE's PRACH, the network sends an RAR, including the CORESET #1 configuration to the UE. Subsequently, the UE receives the RAR, acquires the CORESET #1 configuration and applies the configuration in subsequent PDCCH monitoring. As mentioned before, the CORESET #1 configuration can also be included in message 4, instead of the RAR.

Figure 13:
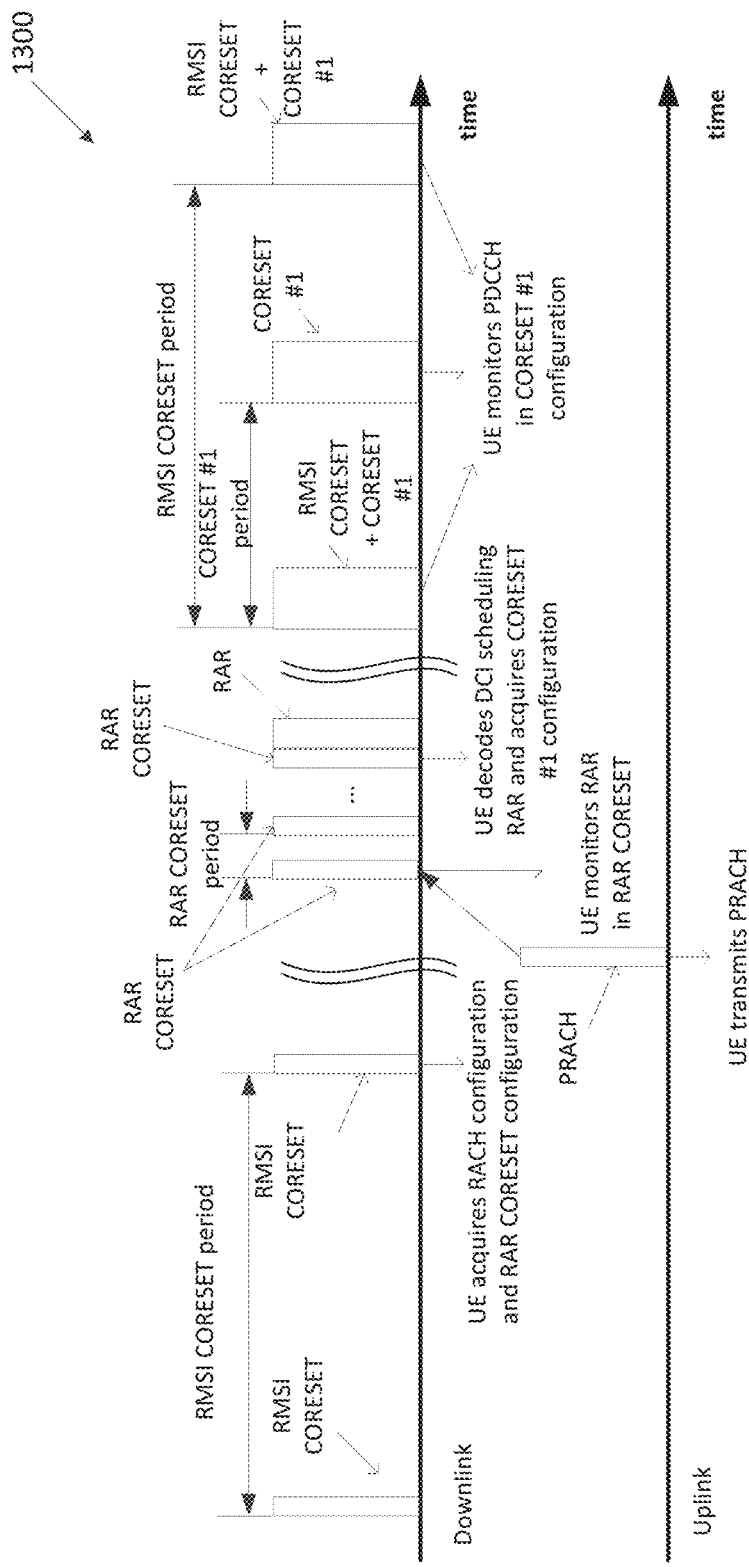
FIG. 13 illustrates an example UE procedure for obtaining CORESET #1 configuration for RAR according to embodiments of the present disclosure.

FIG. 13 illustrates an example UE procedure 1300 for obtaining CORESET #1 configuration for RAR according to embodiments of the present disclosure. An embodiment of the UE procedure 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

An illustration of how the UE changes the UE's PDCCH monitoring behavior or the UE's CORESET configurations over time during the initial access procedure is illustrated in FIG. 13. In the example of FIG. 13, CORESET #1 is configured to include the RMSI CORESET configuration with half of the RMSI CORESET period.

Figure 14:
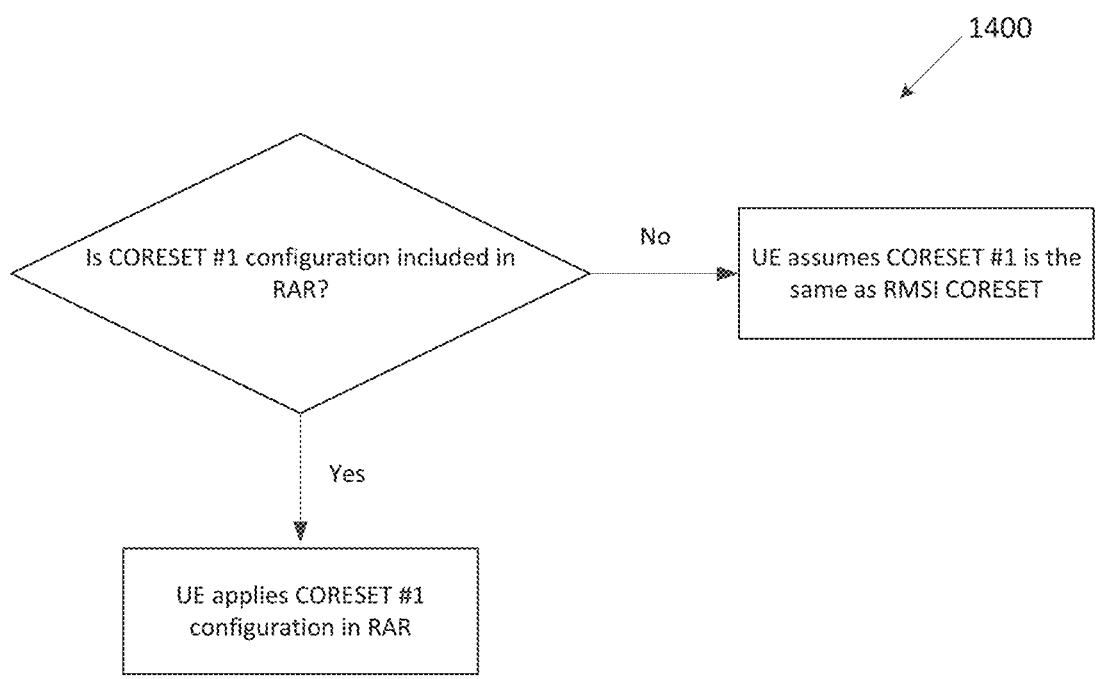
FIG. 14 illustrates another flow chart of a method for obtaining CORESET #1 configuration from RAR according to embodiments of the present disclosure.

FIG. 14 illustrates another flow chart of a method 1400 for obtaining CORESET #1 configuration from RAR according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

The inclusion of CORESET #1 in the RAR or in message 4 can be optional. When the UE does not receive the CORESET #1 configuration, the UE can assume that the monitoring occasions, time and frequency occupancy for CORESET #1 is the same as the RMSI CORESET, except that (possibly) more message types that may be monitored/received by the UE. This procedure is illustrated in FIG. 14.

In one embodiment, the UE obtains the CORESET #1 configurations from a higher layer message such as a MAC message or a RRC message after completion of the random access procedure.

Figure 15:
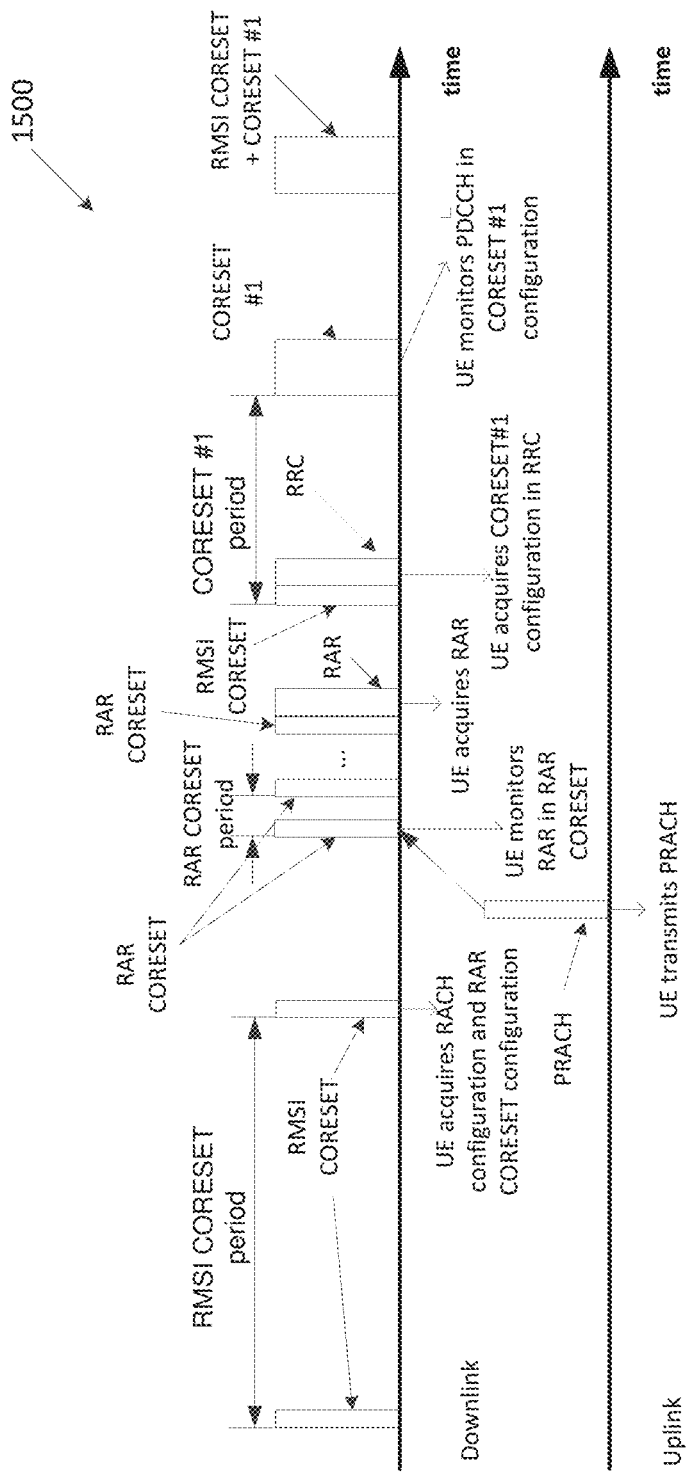
FIG. 15 illustrates another example UE procedure for obtaining CORESET #1 configuration for RAR according to embodiments of the present disclosure.

FIG. 15 illustrates another example UE procedure 1500 for obtaining CORESET #1 configuration for RAR according to embodiments of the present disclosure. An embodiment of the UE procedure 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

An illustration of the procedure with RRC and the impact on the CORESET monitoring by the UE is given in FIG. 15. In such a case, the higher-layer signaling is conveyed on a PDSCH scheduled by a PDCCH transmitted in an RMSI CORESET.

Figure 16:
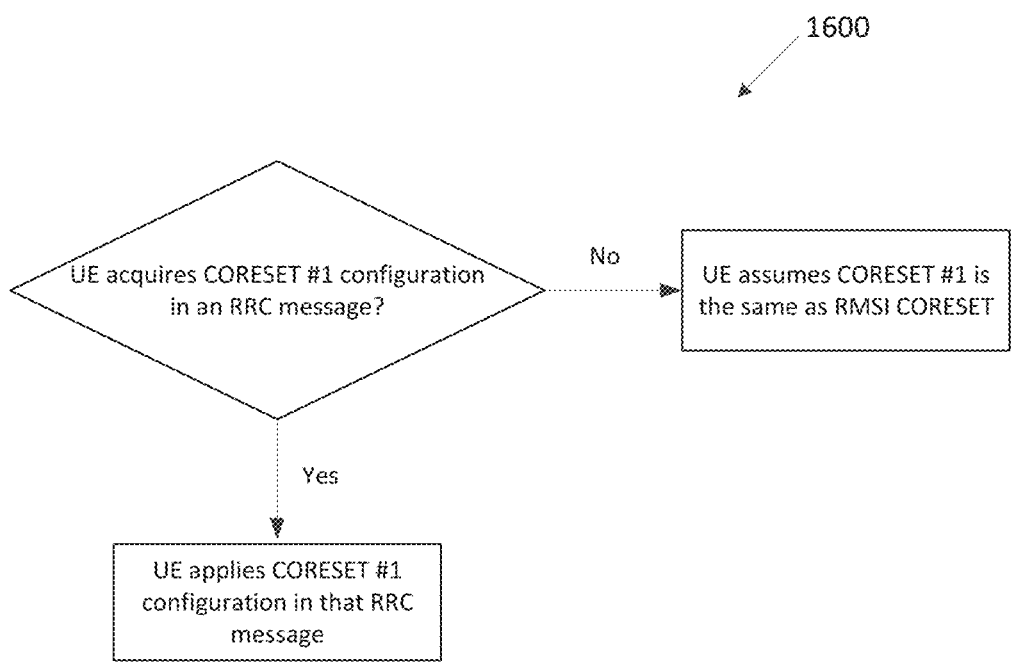
FIG. 16 illustrates an example UE procedure for determining action on whether CORESET #1 configuration is present or absent within RRC message according to embodiments of the present disclosure.

FIG. 16 illustrates an example UE procedure 1600 for determining action on whether CORESET #1 configuration is present or absent within RRC message according to embodiments of the present disclosure. An embodiment of the UE procedure 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

The inclusion of CORESET #1 in the higher layer message can be optional. When the UE does not receive the CORESET #1 configuration, the UE can assume that the monitoring occasions, time and frequency occupancy for CORESET #1 is the same as the RMSI CORESET, except that (possibly) more message types that may be monitored/received by the UE. This procedure is illustrated in FIG. 16 for the example of RRC configuration of CORESET #1.

Figure 17:
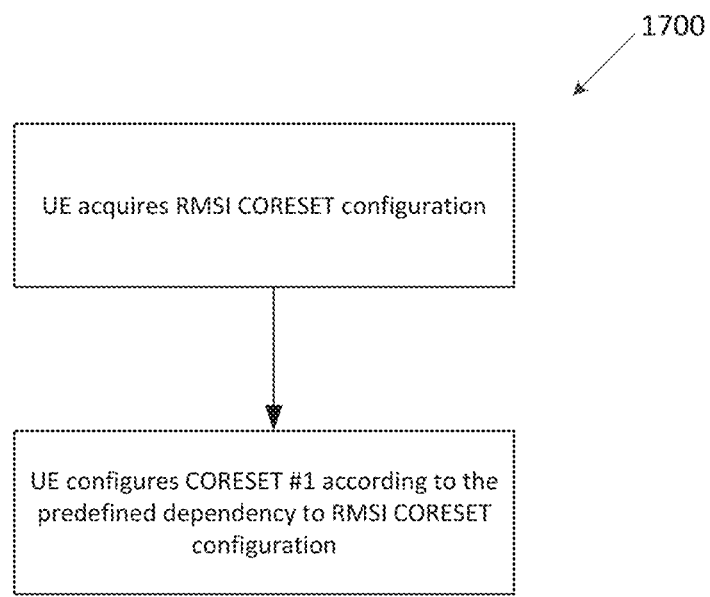
FIG. 17 illustrates an example UE procedure for obtaining CORESET #1 configuration from predefined dependency with RMSI CORESET according to embodiments of the present disclosure.

FIG. 17 illustrates an example UE procedure 1700 for obtaining CORESET #1 configuration from predefined dependency with RMSI CORESET according to embodiments of the present disclosure. An embodiment of the UE procedure 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In one embodiment, the dependency of the CORESET #1 configuration on the RMSI CORESET configuration is predefined. The time instances of the CORESET #1 can be specified to be a function of the time instances of the RMSI CORESET; for example, the time period of the CORESET #1 is a scaling factor of the time period of the RMSI CORESET, with or without a non-zero time offset (e.g., OFDM symbol, slot, radio frame). Similarly, the bandwidth (or the frequency resource block) of the CORESET #1 can be a scaling factor of the RMSI CORESET bandwidth with or without a frequency offset (e.g., resource blocks, bandwidth parts). An example UE procedure of this approach is given in FIG. 17.

If there is already a previously configured CORESET #1 configuration, the latest CORESET #1 configuration transmitted by the network overrides the previously one. The UE may assume the latest CORESET #1 configurations is applicable during RRC connection or RRC inactive mode. In idle mode, the UE may move and the network may lose track of the UE location, including the cell or the TRP or the transmit beam that the UE is associated with. As a result, it is no longer clear whether or not the UE may assume whether the UE's CORESET #1 remains the same or different taking into account idle mode operation and mobility Since the network may need to contact an idle mode UE, e.g., for to deliver paging message, there is a need to specify UE assumption of CORESET #1 configuration in idle mode.

In one embodiment, the UE assumes the CORESET #1 configuration previously configured holds after the UE has transited to idle mode. However, the UE assumes the previously configured CORESET #1 is applicable in idle mode as long as the UE does not change the cell or the TRP or the SS block the UE is associated with. If the UE updates the cell or the TRP or the SS block the UE is associated with in idle mode, the UE also needs to update the UE's CORESET #1 configuration. An example procedure of CORESET #1 updates when the UE updates the best SS block the UE is associated with is illustrated in FIG. 14.

Figure 18:
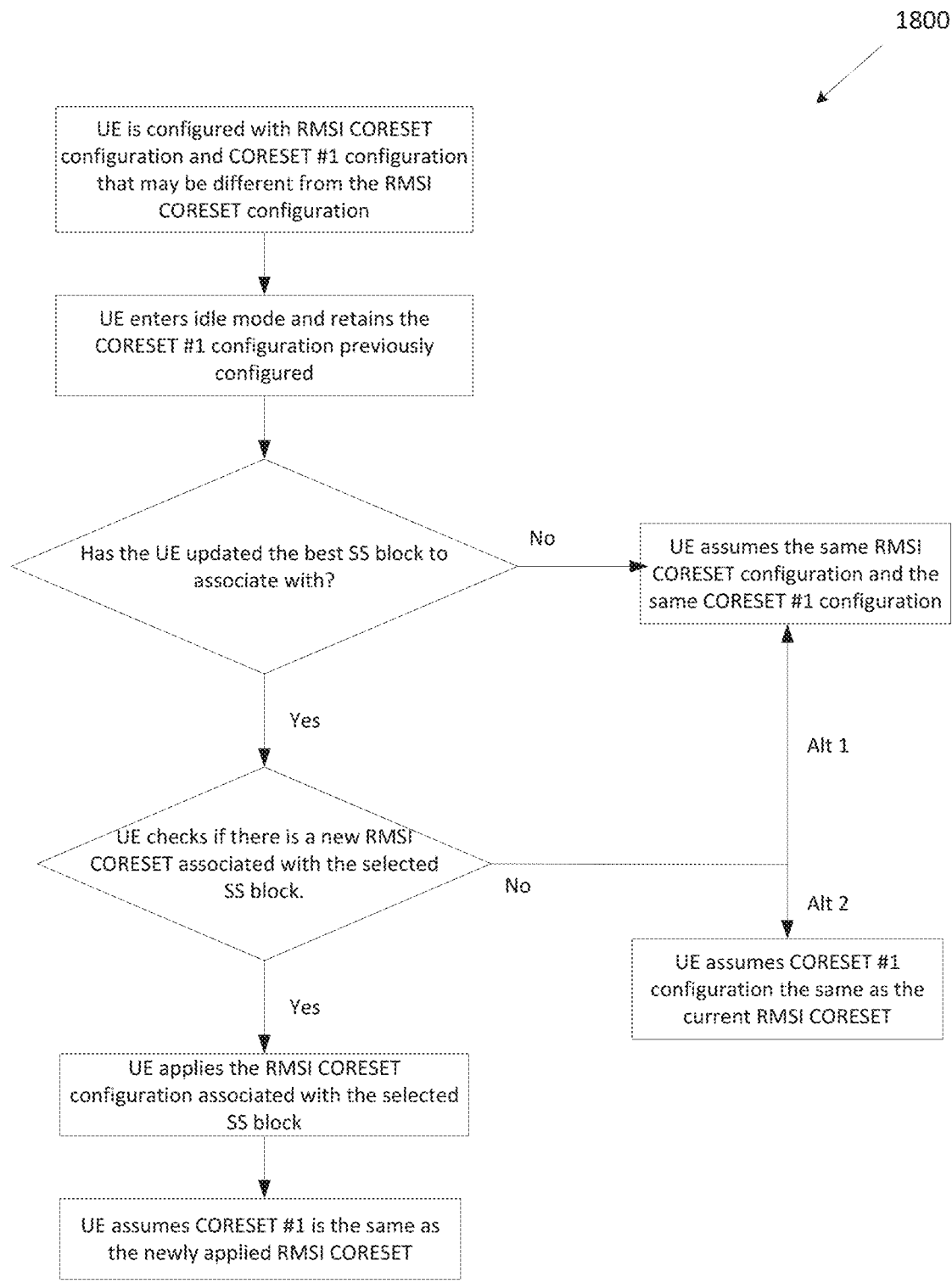
FIG. 18 illustrates an example UE procedure for obtaining CORESET #1 configuration update according to embodiments of the present disclosure.

FIG. 18 illustrates an example UE procedure 1800 for obtaining CORESET #1 configuration update according to embodiments of the present disclosure. An embodiment of the UE procedure 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

As shown in FIG. 18, if the UE updates the SS block the UE is associated with in idle mode, the UE checks if there is a new RMSI CORESET associated with the newly selected SS block. This step can be skipped if the UE assumes there is always a different RMSI CORESET per SS block. If there isn't a new RMSI CORESET, in one alternative (e.g., Alt 1), the UE does not change the UE's current assumption of RMSI CORESET and CORESET #1; in another alternative (e.g., Alt 2), the UE updates the UE's CORESET #1 configuration to be identical to the current RMSI configuration. If there is a new RMSI CORESET associated with the newly selected SS block, the UE applies the new RMSI CORESET configuration associated with the newly selected SS block and assumes the UE's CORESET #1 configuration to be identical to the new RMSI CORESET configuration; the UE subsequently monitors the UE's RMSI CORESET not only for RMSI but potentially also for paging, broadcast/group-cast and unicast messages.

As discussed earlier in the present disclosure, the network may update the CORESET #1 configuration to the UE via RAR/RRC messages. The procedure can also be applied to TRP or cell reselection in idle mode, since the procedures fundamentally involve SS block re-selection, except that the step where the UE checks if there is a new RMSI CORESET associated with the selected SS block can be bypassed at least for cell re-selection.

In another embodiment, the UE assumes the CORESET #1 configuration previously configured no longer holds after the UE has transited to idle mode. The UE assumes the CORESET #1 is the same as the currently configured RMSI CORESET #1 configuration.

Figure 19:
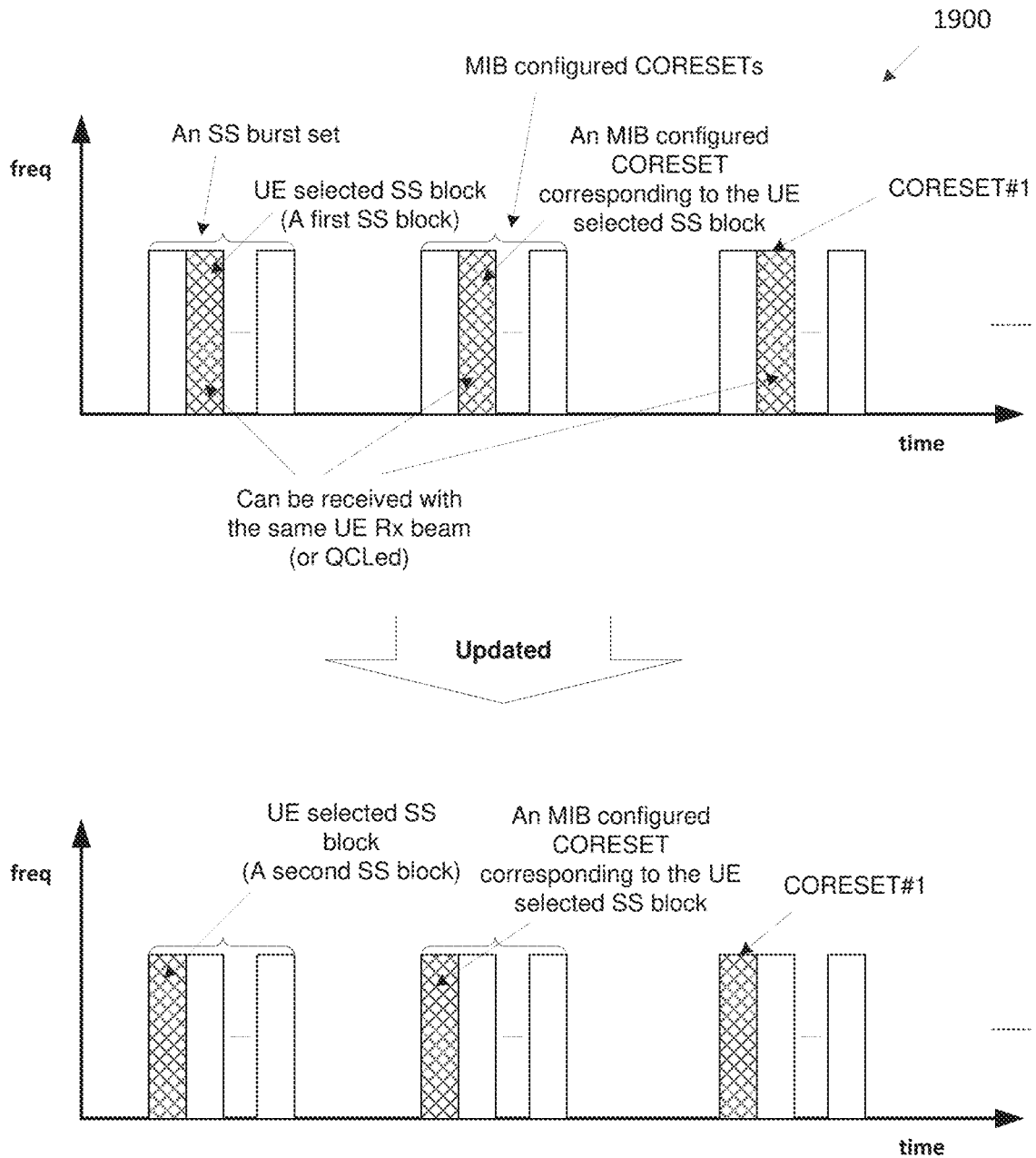
FIG. 19 illustrates an example updated CORESET #1 in an RRC CONNECTED mode according to embodiments of the present disclosure.

FIG. 19 illustrates an example updated CORESET #1 in an RRC CONNECTED mode 1900. An embodiment of the updated CORESET #1 in an RRC CONNECTED mode 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure.

When a UE moves within coverage area of a serving cell, the UE may get strongest RSRP from a different SS block than the one UE initially selected (denoted as a first SS block). In such a case, the CORESET #1 is updated, along with the corresponding QCL relations. This is illustrated in FIG. 19. When the update occurs, the selected SS block, the MIB configured CORESET and CORESET #1 are all updated correspondingly. The update may be triggered by an event that UE reports that a second SS block has the largest RSRP among the SS blocks configured to measure and report. Alternatively, UE may request the network to update the default CORESET with indicating a preferred SS block index; the acknowledgement of the request may result in the update of the CORESET #1. Alternatively, the network may indicate an SS block index corresponding to the second SS block so that UE can update the CORESET #1, which is correspondingly configured according to the second SS block. The update message is conveyed in the higher layer, e.g., RRC or MAC.

Figure 20:
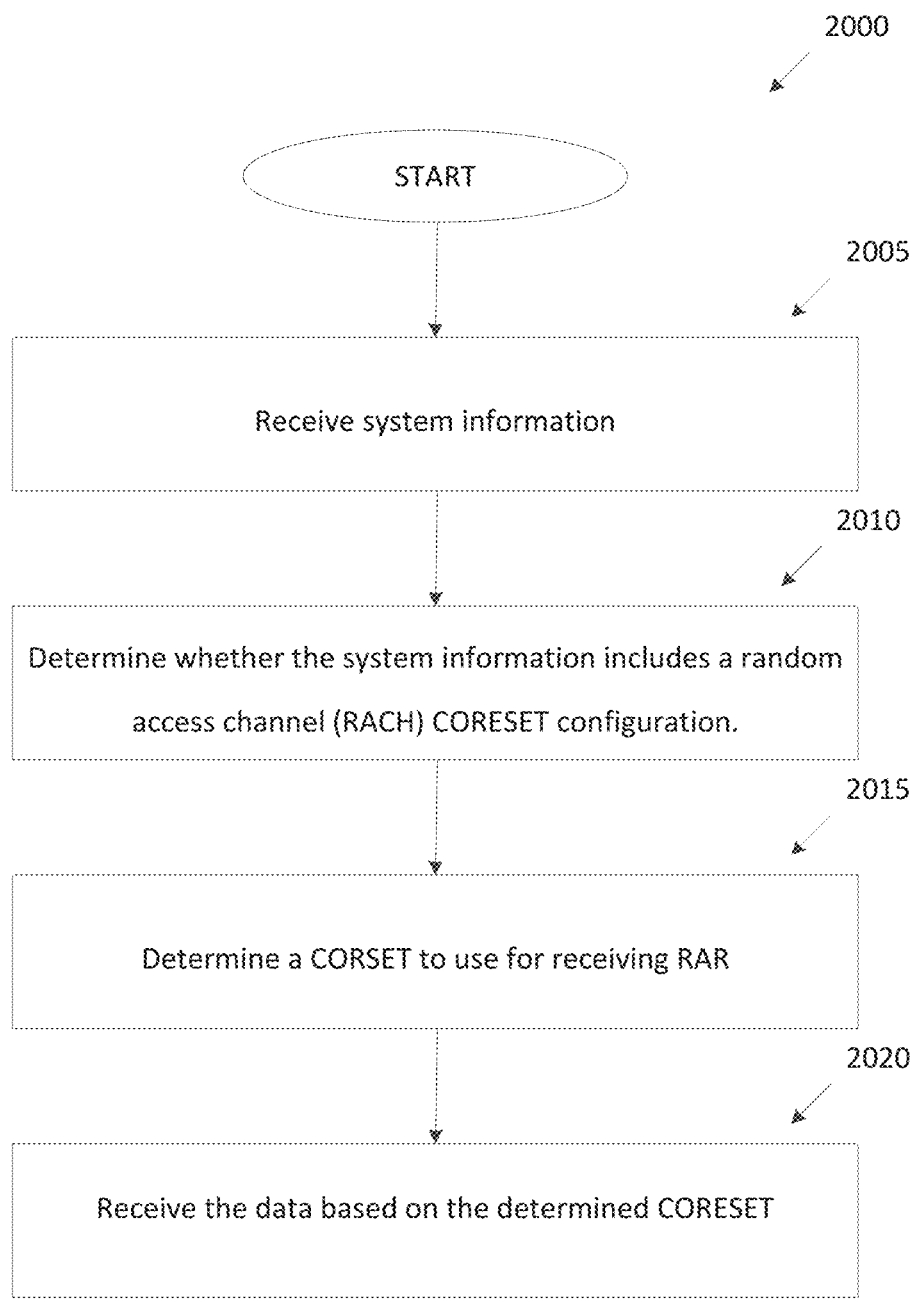
FIG. 20 illustrates a flow chart of a method for obtaining CORESET for transmission on RACH according to embodiments of the present disclosure.

FIG. 20 illustrates a flow chart of a method 2000, as may be performed by a user equipment (e.g., 111-116 as illustrated in FIG. 1), for obtaining CORESET for transmission on RACH according to embodiments of the present disclosure. An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 20, the method 2000 begins at step 2005. At step 2005, the UE receives, from a base station (BS), system information.

At step 2010, the UE determines whether the system information includes a random access channel (RACH) CORESET configuration.

At step 2015, the UE determines a CORSET to use for receiving a random access response (RAR) based on whether the RACH CORESET configuration is included in the system information.

In one embodiment, the UE at step 2015 determines to use a RACH CORESET in response to determining that the system information includes the RACH CORESET configuration.

In another embodiment, the UE at step 2015 determines the CORSET to use as a remaining minimum system information (RMSI) CORESET in response to determining that the system information does not include the RACH CORESET configuration.

In yet another embodiment, the UE at step 2015 determines monitoring occasions, and time and frequency occupancy for the RACH as monitoring occasions, and time and frequency occupancy determined in the RMSI CORESET.

In yet another embodiment, the UE at step 2015 determines the CORESET for a Type0-physical downlink control channel (Type0-PDCCH) common search space using higher layer parameters including an RMSI-PDCCH-Config.

In yet another embodiment, the UE at step 2015 determines the CORESET for subcarrier spacing using the higher layer parameters including an RMSI-subcarrier spacing (RMSI-scs) for a PDCCH reception.

In yet another embodiment, the UE at step 2015 determines the CORESET and monitoring occasions for the Type0-PDCCH common search space.

In such embodiments, the UE assumes that at least one of unicast data or groupcast messages is scheduled based on the RACH CORESET. In such embodiments, the UE assumes that at least one of system information block (SIB) or groupcast message is scheduled based on the RMSI CORESET, the RMSI CORESET being determined at an initial access procedure of the UE.

At step, 2020, the UE receives, from the BS, the data based on the determined CORESET. In one embodiment, the UE at step 2020 receives the RAR based on the RACH CORESET. In another embodiment, the UE receives the RAR based on the RMSI CORESET.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method performed by a user equipment (UE) in a communication system, the method comprising:
   receiving, from a base station, a master information block (MIB) including information on a first control resource set (CORESET) associated with a first physical downlink control channel (PDCCH) scheduling remaining system information (RMSI);
   receiving the RMSI based on the first CORESET, wherein the RMSI includes information on a second CORESET on which a second PDCCH scheduling a random access response (RAR) message is received;
transmitting to the base station, a physical random access channel (PRACH); and
receiving, from the base station, the RAR message in response to the PRACH via the second CORESET.

2. The method of claim 1, wherein the RMSI includes random access channel (RACH) configuration information.

3. The method of claim 1, wherein one or more CORESETs other than the first CORESET are configured from the base station, and
wherein the one or more CORESET are contained in a bandwidth of the first CORESET.

4. The method of claim 3, wherein the one or more CORESETs comprises a third CORESET associated with a system information block or a fourth CORESET associated with a paging message.

5. A method performed by a base station in a communication system, the method comprising:
transmitting, to a UE, a master information block (MIB) including information on a first control resource set (CORESET) associated with a remaining minimum system information (RMSI);
transmitting, to the UE, the RMSI based on the first CORESET, wherein the RMSI includes information on a second CORESET on which a second PDCCH scheduling a random access response (RAR) message is received;
receiving, from the UE, a physical random access channel (PRACH); and
transmitting, to the UE, the RAR message in response to the PRACH via the second CORESET.

6. The method of claim 5, wherein the RMSI includes random access channel (RACH) configuration information.

7. The method of claim 5, wherein one or more CORESETs other than the first CORESET are configured to the UE, and
wherein the one or more CORESET are contained in a bandwidth of the first CORESET.

8. The method of claim 7, wherein the one or more CORESETs comprises a third CORESET associated with a system information block or a fourth CORESET associated with a paging message.

9. A user equipment (UE) in a communication system, the UE comprising:
a transceiver configured to:
receive, from a base station, a master information block (MIB) including information on a first control resource set (CORESET) associated with a first physical downlink control channel (PDCCH) scheduling remaining system information (RMSI);
receive the RMSI based on the first CORESET, wherein the RMSI includes information on a second CORESET on which a second PDCCH scheduling a random access response (RAR) message is received;
transmit to the base station, a physical random access channel (PRACH); and
receive, from the base station, the RAR message in response to the PRACH via the second CORESET.

10. The UE of claim 9, wherein the RMSI includes random access channel (RACH) configuration information.

11. The UE of claim 9, wherein one or more CORESETs other than the first CORESET are configured from the base station, and
wherein the one or more CORESET are contained in a bandwidth of the first CORESET.

12. The UE of claim 11, wherein the one or more CORESETs comprises a third CORESET associated with a system information block or a fourth CORESET associated with a paging message.

13. A base station in a communication system, the base station comprising:
a transceiver configured to:
transmit, to a UE, a master information block (MIB) including information on a first control resource set (CORESET) associated with a remaining minimum system information (RMSI),
transmit, to the UE, the RMSI based on the first CORESET, wherein the RMSI includes information on a second CORESET on which a second PDCCH scheduling a random access response (RAR) message is received;
receive, from the UE, a physical random access channel (PRACH); and
transmit, to the UE, a the RAR message in response to the PRACH based on-via the second CORESET.

14. The base station of claim 13, wherein the RMSI includes random access channel (RACH) configuration information.

15. The base station of claim 13, wherein one or more CORESETs other than the first CORESET are configured to the UE, and
wherein the one or more CORESET are contained in a bandwidth of the first CORESET.

16. The base station of claim 15, wherein the one or more CORESETs comprises a third CORESET associated with a system information block or a fourth CORESET associated with a paging message.

* * * * *